US011066067B2

(12) United States Patent
Li et al.

(10) Patent No.: US 11,066,067 B2
(45) Date of Patent: Jul. 20, 2021

(54) PLANNING PARKING TRAJECTORY FOR SELF-DRIVING VEHICLES

(71) Applicant: Baidu USA LLC, Sunnyvale, CA (US)

(72) Inventors: Dong Li, Sunnyvale, CA (US); Qi Luo, Santa Clara, CA (US); Liangliang Zhang, San Jose, CA (US); Yifei Jiang, Sunnyvale, CA (US); Jiaming Tao, Sunnyvale, CA (US); Jiangtao Hu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 251 days.

(21) Appl. No.: 16/023,694

(22) Filed: Jun. 29, 2018

(65) Prior Publication Data

US 2020/0001863 A1   Jan. 2, 2020

(51) Int. Cl.
*B60W 30/06*   (2006.01)
*G05D 1/00*   (2006.01)
(Continued)

(52) U.S. Cl.
CPC ........... *B60W 30/06* (2013.01); *G05D 1/0088* (2013.01); *G05D 1/0212* (2013.01);
(Continued)

(58) Field of Classification Search
CPC .............. B60W 30/06; B60W 2554/00; G05D 1/0088; G05D 1/0212; G05D 2201/0213; G06K 9/00812; G06K 9/00805
See application file for complete search history.

(56) References Cited

U.S. PATENT DOCUMENTS 5,403,238 A * 4/1995 Baxter .................. A63G 31/16
 104/78
8,379,924 B2 * 2/2013 Schaufler ........... G06K 9/00805
 382/104
(Continued)

FOREIGN PATENT DOCUMENTS

CN     101198351 A * 6/2008 ........... H04N 13/398
CN     101918557 A * 12/2010 ......... C12N 15/8509
(Continued)

*Primary Examiner* — Behrang Badii
*Assistant Examiner* — Jalal C Coduroglu
(74) *Attorney, Agent, or Firm* — Womble Bond Dickinson (US) LLP

(57) ABSTRACT

A parking system for autonomous driving vehicles (ADV) is disclosed that utilizes the perception, planning, and prediction modules of ADV driving logic to more safely and accurately park an ADV. An ADV scans a parking lot for an available space, then determines a sequence of portions or segments of a parking path from the ADV's location to a selected parking space. The sequence of segments involves one or more forward driving segments and one or more reverse driving segments. During the forward driving segments, the ADV logic uses the perception, planning, and prediction modules to identify one or more obstacles to the ADV parking path, and speed and direction of those obstacles. During a reverse driving segment, the ADV logically inverts the orientation of the perception, planning, and prediction modules to continue to track the one or more obstacles and their direction and speed while the ADV is driving in a reverse direction. For each parking path portion, the planning module generates a smooth reference line for the portion, taking into account the one or more obstacles, and their speed and direction.

23 Claims, 10 Drawing Sheets

(51) Int. Cl.
*G06K 9/00* (2006.01)
*G05D 1/02* (2020.01)

(52) U.S. Cl.
CPC ..... *G06K 9/00805* (2013.01); *G06K 9/00812* (2013.01); *B60W 2554/00* (2020.02); *G05D 2201/0213* (2013.01)

(56) References Cited

U.S. PATENT DOCUMENTS

| | | | | |
|---|---|---|---|---|
| 9,248,834 | B1* | 2/2016 | Ferguson | G05D 1/0088 |
| 9,260,113 | B2* | 2/2016 | Kasiraj | B60K 31/0008 |
| 9,274,522 | B2* | 3/2016 | Boos | B62D 1/00 |
| 9,323,250 | B2* | 4/2016 | Wang | B25J 11/009 |
| 9,429,955 | B2* | 8/2016 | Kamen | B62D 51/002 |
| 9,513,631 | B2* | 12/2016 | Boos | G06F 3/04883 |
| 9,630,619 | B1* | 4/2017 | Kentley | G01C 21/32 |
| 9,669,827 | B1* | 6/2017 | Ferguson | B60W 50/0097 |
| 9,740,212 | B2* | 8/2017 | D'Andrea | G05D 1/0291 |
| 9,785,149 | B2* | 10/2017 | Wang | G16H 40/67 |
| 9,870,002 | B1* | 1/2018 | Holmberg | B25J 9/162 |
| 9,914,452 | B1* | 3/2018 | Ferguson | B60W 30/0953 |
| 10,156,850 | B1* | 12/2018 | Ansari | B60W 30/095 |
| 10,569,773 | B2* | 2/2020 | Zhao | G06K 9/00805 |
| 10,597,264 | B1* | 3/2020 | Muck | B25J 19/023 |
| 10,606,075 | B2* | 3/2020 | Choi | G02B 27/0101 |
| 10,698,407 | B2* | 6/2020 | Ostafew | G01C 21/362 |
| 2007/0288133 | A1* | 12/2007 | Nishira | G05D 1/0246 701/23 |
| 2013/0151060 | A1* | 6/2013 | Lee | B62D 15/0285 701/25 |
| 2013/0169792 | A1* | 7/2013 | Mathes | B62D 15/027 348/119 |
| 2014/0139677 | A1* | 5/2014 | Lambert | H04N 7/183 348/148 |
| 2014/0249691 | A1* | 9/2014 | Hafner | B62D 15/0275 701/1 |
| 2014/0303849 | A1* | 10/2014 | Hafner | B60W 50/14 701/42 |
| 2015/0158527 | A1* | 6/2015 | Hafner | B62D 15/027 701/41 |
| 2015/0203156 | A1* | 7/2015 | Hafner | B62D 15/027 701/36 |
| 2015/0344028 | A1* | 12/2015 | Gieseke | B62D 15/028 701/1 |
| 2016/0107643 | A1* | 4/2016 | Mizutani | G01S 13/931 701/519 |
| 2017/0015312 | A1* | 1/2017 | Latotzki | B62D 15/027 |
| 2017/0017239 | A1* | 1/2017 | Kanai | A01B 39/00 |
| 2017/0023663 | A1* | 1/2017 | Subburaj | G01S 13/931 |
| 2017/0028984 | A1* | 2/2017 | Kiyokawa | G01S 15/931 |
| 2017/0158236 | A1* | 6/2017 | Kim | B62D 15/0285 |
| 2017/0259831 | A1* | 9/2017 | Hoshino | B60W 50/14 |
| 2017/0277202 | A1* | 9/2017 | Li | G05D 1/0891 |
| 2017/0282915 | A1* | 10/2017 | Kim | B60W 10/18 |
| 2018/0024553 | A1* | 1/2018 | Kong | G05D 1/0248 701/26 |
| 2018/0059672 | A1* | 3/2018 | Li | G05D 1/0088 |
| 2018/0082588 | A1* | 3/2018 | Hoffman, Jr. | G08G 1/166 |
| 2018/0107942 | A1* | 4/2018 | Jiang | G08G 1/096725 |
| 2018/0111612 | A1* | 4/2018 | Jiang | G05D 1/0219 |
| 2018/0120853 | A1* | 5/2018 | Seo | B62D 15/0285 |
| 2018/0127000 | A1* | 5/2018 | Jiang | G05D 1/0088 |
| 2018/0136643 | A1* | 5/2018 | Tao | B60Q 1/50 |
| 2018/0136652 | A1* | 5/2018 | Jiang | G05D 1/0088 |
| 2018/0136653 | A1* | 5/2018 | Tao | G07C 5/00 |
| 2018/0156632 | A1* | 6/2018 | Jung | G01C 21/3415 |
| 2018/0164810 | A1* | 6/2018 | Luo | B60W 10/30 |
| 2018/0170395 | A1* | 6/2018 | Luo | G05D 1/0088 |
| 2019/0118801 | A1* | 4/2019 | Noh | G06K 9/00805 |
| 2020/0001862 | A1* | 1/2020 | Luo | B60W 60/001 |
| 2020/0001863 | A1* | 1/2020 | Li | G06K 9/00812 |
| 2020/0149911 | A1* | 5/2020 | Lamoreaux | G06K 7/10871 |
| 2020/0225673 | A1* | 7/2020 | Ebrahimi Afrouzi | B25J 9/1697 |

FOREIGN PATENT DOCUMENTS

| | | | | |
|---|---|---|---|---|
| CN | 1902673 B | * | 6/2011 | G09G 3/3473 |
| CN | 102542843 A | * | 7/2012 | G05D 1/0011 |
| CN | 103380453 A | * | 10/2013 | G09G 3/346 |
| CN | 104843066 A | * | 8/2015 | G05D 1/027 |
| CN | 105549597 A | * | 5/2016 | G01S 7/40 |
| CN | 105984541 A | * | 10/2016 | |
| CN | 107284438 A | * | 10/2017 | |
| CN | 106102549 B | * | 12/2018 | A61B 1/00006 |
| JP | 2016066322 | | 4/2016 | |
| JP | 2016117345 A | * | 6/2016 | |
| KR | 20130118116 | | 10/2013 | |
| KR | 20190045554 A | * | 5/2019 | B62D 15/0285 |
| WO | WO-0177744 A1 | * | 10/2001 | H04N 13/398 |
| WO | WO-2008156201 A1 | * | 12/2008 | G05D 1/027 |
| WO | WO-2013030480 A1 | * | 3/2013 | G08G 1/165 |
| WO | WO-2016054291 A1 | * | 4/2016 | G01S 7/40 |

* cited by examiner

US 11,066,067 B2

PLANNING PARKING TRAJECTORY FOR SELF-DRIVING VEHICLES

TECHNICAL FIELD

Embodiments of the present disclosure relate generally to operating autonomous vehicles. More particularly, embodiments of the disclosure relate to parking planning for navigating an autonomous driving vehicles (ADVs) in the presence of potential obstacles.

BACKGROUND

Parking planning is important when navigating an autonomous driving vehicle (ADV) around one or more moving obstacles on the ADV's route to a parking space. In the prior art, parking planning algorithms use a zig-zag algorithm that accounts for static obstacles immediately surrounding the vehicle being parked. Such obstacles may include other parked cars, road curbs, and other fixed obstacles. Parking logic in vehicles that provide a human driver with an automated parking-assist feature can detect objects surrounding the vehicle, but do not predict the location, speed, and direction of the objects. Thus, an obstacle may not initially be close to a moving vehicle, but the obstacle may be moving toward the vehicle and will not be considered by the parking logic until the obstacle is within a predetermined boundary surrounding the vehicle. That may be too late to avoid a collision with the moving obstacle.

Current parking logic in automated parking-assist systems does not take into account the movement of the obstacles when parking the vehicle. ADVs can detect moving obstacles. But, ADVs of the prior art are designed for forward driving. Parking often involves driving in reverse during at least a portion of the parking process. ADVs of the prior art perform parking in the same manner as human-driven cars having parking assist: they treat obstacles as static objects and do not take into account obstacle speed, direction, and movement, when planning a parking path, particularly when the parking path involves driving in reverse.

BRIEF DESCRIPTION OF THE DRAWINGS

Embodiments of the present disclosure are illustrated by way of example and not limitation in the figures of the accompanying drawings in which like references indicate similar elements.

DETAILED DESCRIPTION

Figure 1:
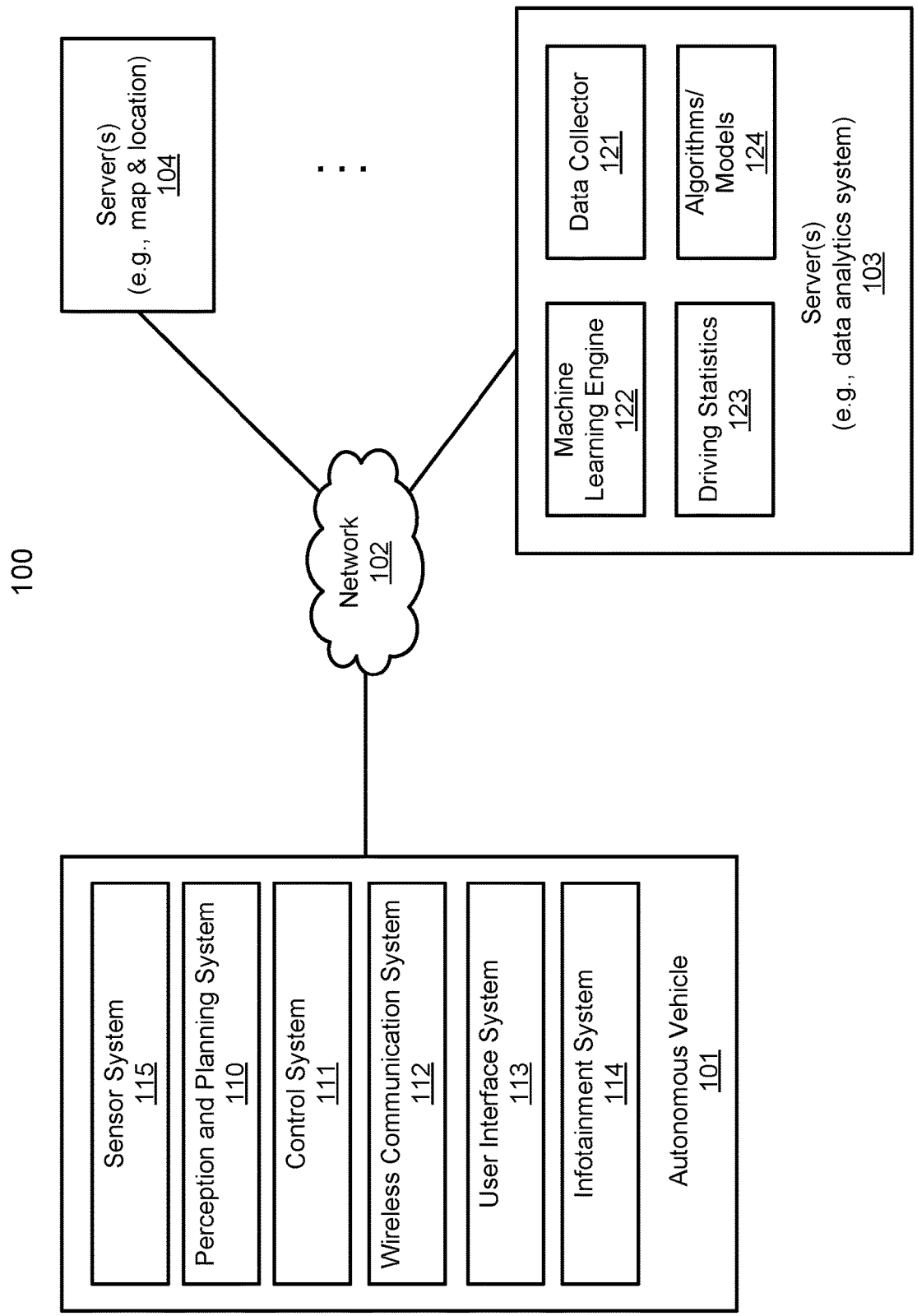
FIG. 1 is a block diagram illustrating a networked system for implementing a method for optimized planning of parking trajectory and obstacle avoidance when parking an autonomous driving vehicle (ADV), according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In one embodiment, a computer-implemented method of parking an autonomous driving vehicle (ADV) includes generating a parking path to park the ADV in a selected parking space. The parking path can take into account obstacles surrounding the ADV, and the location, speed, and direction of movement (if any) of the obstacles. The parking path may be generated as a "zig-zag" pattern having at least a first path portion and a second path portion. The first and second path portions can have differing driving directions of the ADV, such that one of the first and second path portions is driven in a forward direction, and the other portion is driven in a reverse direction.

Physical forward and reverse driving directions, as used herein, have their convention meanings unless specified otherwise. In a forward driving direction, the ADV is configured to drive using a forward gear. In a reverse driving direction, the ADV is configured to drive using a reverse gear. The aforementioned physical driving direction can be distinct from a driving orientation. Driving orientation refers to whether one or more of the perception, prediction, and planning modules of the ADV are oriented to perceive obstacles, predict the direction, speed, and location of obstacles, or plan a portion of a driving route with reference to the forward driving direction of the car, or the reverse driving direction of the ADV. In response to determining that a direction for the first path portion is a forward driving direction of the ADV, one or more of the perception, prediction, and planning modules of the ADV are set to a forward orientation of the ADV. Otherwise, the one or more of the perception, prediction, and planning modules are set to a reverse, or inverted, orientation.

In an embodiment, a reverse, or inverted, orientation of the perception, prediction, or planning module includes rotating the real world orientation inverted module 180° from the forward orientation. The perception and prediction modules can determine one or more obstacles surrounding the ADV, and the location, speed, and direction of the obstacles with respect to the ADV. The planning module can include a parking planning sub-module that can generate a parking path from the current location of the ADV to a selected parking space, taking into account the one or more obstacles detected by the perception and prediction modules.

The parking path can be broken into parking path segments at discontinuous (indifferentiable) point of the parking path. The planning module can generate a smooth reference line for the first of the segments of the parking path, and the ADV can navigate the first segment of the parking path using the smooth reference line. The next segment of the parking path may request the ADV to drive in reverse. If so, one or more of the perception, prediction, or planning module orientations can be inverted, and the driving direction of the ADV can be reversed from the current driving direction of the ADV. The perception and prediction modules can update the location, speed, and direction of each of the obstacles surrounding the ADV. Then, the ADV can use the planning module to generate, and navigate, a second reference path for the second portion, in relation to the one or more obstacles surrounding the ADV. This process can be repeated, one segment at a time, until the ADV has been parking in the selected parking space.

FIG. 1 is a block diagram illustrating a networked system 100 for implementing a method for optimized planning of parking trajectory and obstacle avoidance when parking an autonomous driving vehicle (ADV), according to one embodiment.

Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to operate in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In an embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
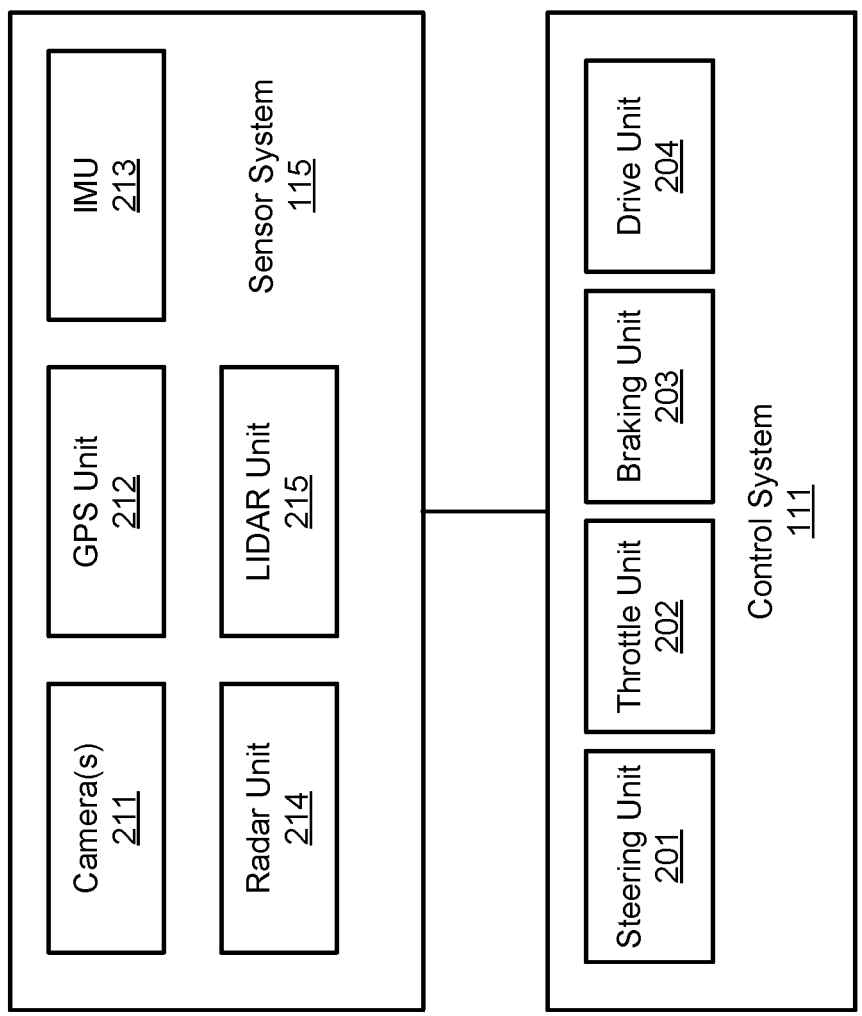
FIG. 2 is a block diagram illustrating an example of an autonomous vehicle that can implement a method for optimized planning of parking trajectory and obstacle avoidance when parking an autonomous driving vehicle (ADV), according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS unit 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. Cameras 211 may include an infra-red camera. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In an embodiment, vehicle control system 111 includes, but is not limited to, steering unit 201, throttle unit 202 (also referred to as an acceleration unit), braking unit 203, and drive unit 204. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Braking unit can alternatively, or in addition, including electrical (regenerative) braking, braking by engine compression, air brake, or other controllable system of decelerating the ADV. Drive unit 204 controls a drive mechanism of the autonomous vehicle. The drive unit 204 can control whether the autonomous driving vehicle is driven in a forward direction or in a reverse direction. Forward and reverse direction of the drive unit 204 have their conventional meaning: in a forward direction, the drive wheels of the autonomous vehicle move the ADV in a direction that is understood as the front of the ADV. In a reverse direction, the drive wheels of the ADV drive the ADV in a direction that is understood as the rear of the ADV. In an embodiment, drive unit 204 can also select from one or more drive gears in a transmission of the vehicle. Alternatively, the ADV can have an automatic transmission or a continuously variable transmission that does not require forward gear selection. In an embodiment, drive unit 204 can also set a "park" position of the transmission that does not drive the ADV in either a forward direction or a reverse direction. In an embodiment, drive unit 204 can also set, and release, a parking brake. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently. An optimal route can include a plurality of segments, each of which can be optimized by the perception and planning system 110 by determining an optimal path curve for the segment from a plurality of candidate path curves for the segment, each generated by the perception and planning system 110.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 can include parking paths planning by planning module 110 and statistics regarding the success or failure of chosen parking paths. The driving statistics 123 can be used with machine learning engine 122 to train on successful parking paths.

Figure 3:
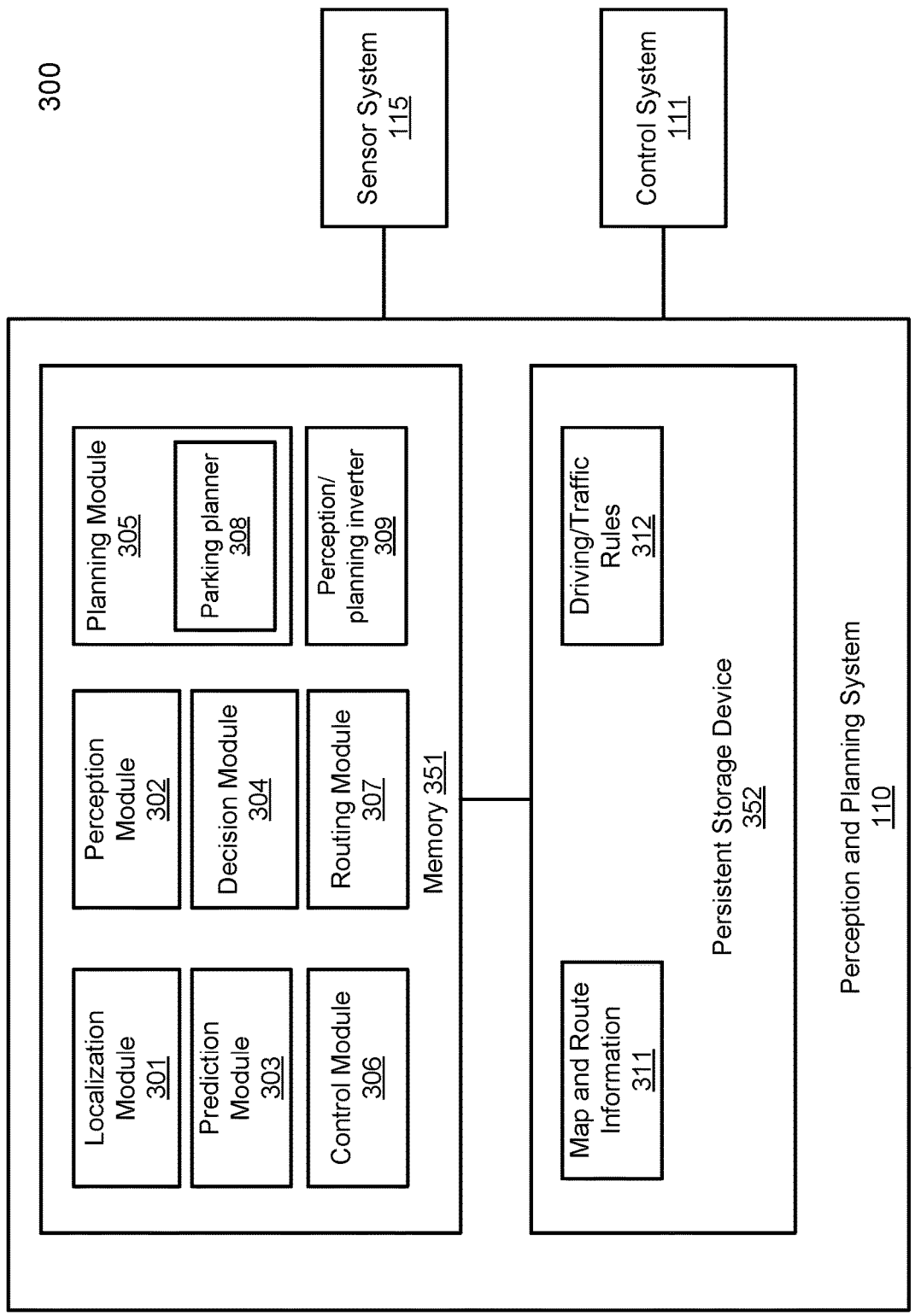
FIG. 3 is a block diagram illustrating an example of a perception and planning system of an autonomous vehicle that implements a method for optimized planning of parking trajectory and obstacle avoidance when parking an autonomous driving vehicle (ADV), according to one embodiment.

FIG. 3 is a block diagram illustrating an example of a perception and planning system 300 of an autonomous vehicle that implements a method for optimized planning of parking trajectory and obstacle avoidance when parking an autonomous driving vehicle (ADV), according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, routing module 307, parking planner 308, and perception/planning inverter 309. Localization module 301 can include map and route data 311 and routing module 307.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 may be referred to as a map and route module. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, and the least path curve determined from the plurality of candidate path curves for a driving segment of a route, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control, and drive unit commands) based on the planning and control data of the current cycle. Control module 306 can be bypassed such that a human driver can control the ADV while other logic of the ADV remains operational.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time. Examining all of the possible routes can include, for a route selected from the possible route, determining a segment of the selected route, and determining a plurality of candidate path curves for navigating the segment of the selected route. Navigating a driving segment (or "path") can include determining a parking path from a current location of the ADV to a parking space selected by the ADV logic. Parking logic can be implemented in the parking planner 308.

Parking planner 308 can be incorporated in planning module 305, or can be implemented as a separate logic unit of the ADV. Parking planner 307 can access other modules of perception and planning system 110 such as map and route information 311, localization module 301, perception module 203, prediction module 303, and other modules of perception and planning system 110. Parking planner 308 can scan a parking area, such as a parking lot, to determine whether a parking space is available in the parking area. Parking planner 308 can use map and route information 311 in performing the scanning of the parking lot. Parking planner 308 can select a parking space from one more available spaces and generate a parking path the parking space.

Navigating a parking path may be preceded by navigating an approach path that positions the ADV near the parking space, or parking area, such that parking-specific logic can be invoked to park the ADV in the parking space. The approach path can be navigated using existing ADV logic. A parking path can have at least a first portion and second portion, in which the ADV changes direction from a forward drive direction to a reverse drive direction, or reverse to forward. In the forward drive direction, the ADV perception and planning logic can perceive obstacles, predict a speed, direction, and location of the obstacles, and plan a smooth reference line for the ADV 101 to navigate a portion of the parking path. In the reverse driving direction, the ADV 101 can invert orientation of the planning, perception, and prediction modules so that obstacles can again be located, and speed, direction, and location can be predicted. The perception 302, and prediction 303, and planning 305, modules can be inverted using perception/planning inverter 309.

In an embodiment, parking planner 308 can take into account one or more physical factors ("kinematics") of the ADV 101. For example, when the ADV 101 is driven in the reverse driving direction, the wheels that perform a steering function may be located at an opposite end of the ADV, thus causing minor changes in how the ADV handles and navigates along a reference path. Steering geometry, braking, acceleration, suspension, weight distribution, gear ratios, and other physical factors may have an effect on the handling of the vehicle during reverse direction driving vs. forward direction driving. Parking planner 308 can account for these kinematic differences between driving in the forward direction vs. driving in the reverse direction.

Perception/planning inverter module 309 can logically invert the orientation and operation of the perception 302, prediction 303, and planning 305 modules in accordance with the driving direction of the ADV 101. An advantage of the present disclosure is that the perception, prediction, and planning modules of an ADV can be used during parking. Parking often requires that at least a portion of a parking path be driven in a reverse driving direction. The perception, prediction, and planning modules of the forward direction logic in an ADV can be logically inverted and utilized for reverse direction driving. For example, when an ADV is driving forward, an obstacle that is located at the front right of the ADV would be located at the rear left of the ADV when the ADV is driven in reverse driving mode. If that same object were getting closer to the ADV in forward driving direction, either by the ADV driving toward the obstacle or the obstacle approaching the ADV, or both, then when the ADV is driven in the reverse driving direction the obstacle would be either receding from the ADV, still approaching the ADV, but more slowly, or appear to not be moving, because the ADV is moving in a reverse direction. Thus, the ADV perception, prediction, and planning logic can be used in both forward and reverse driving directions to detect obstacles, and predict their location, direction and speed. To accomplish this, the perception, prediction, and planning need to be logically invertible to account for the change in direction of the ADV. In an embodiment, inverting the perception, prediction, and planning modules can include rotating the orientation of the modules logically by 180°.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figures 4A, 4B:
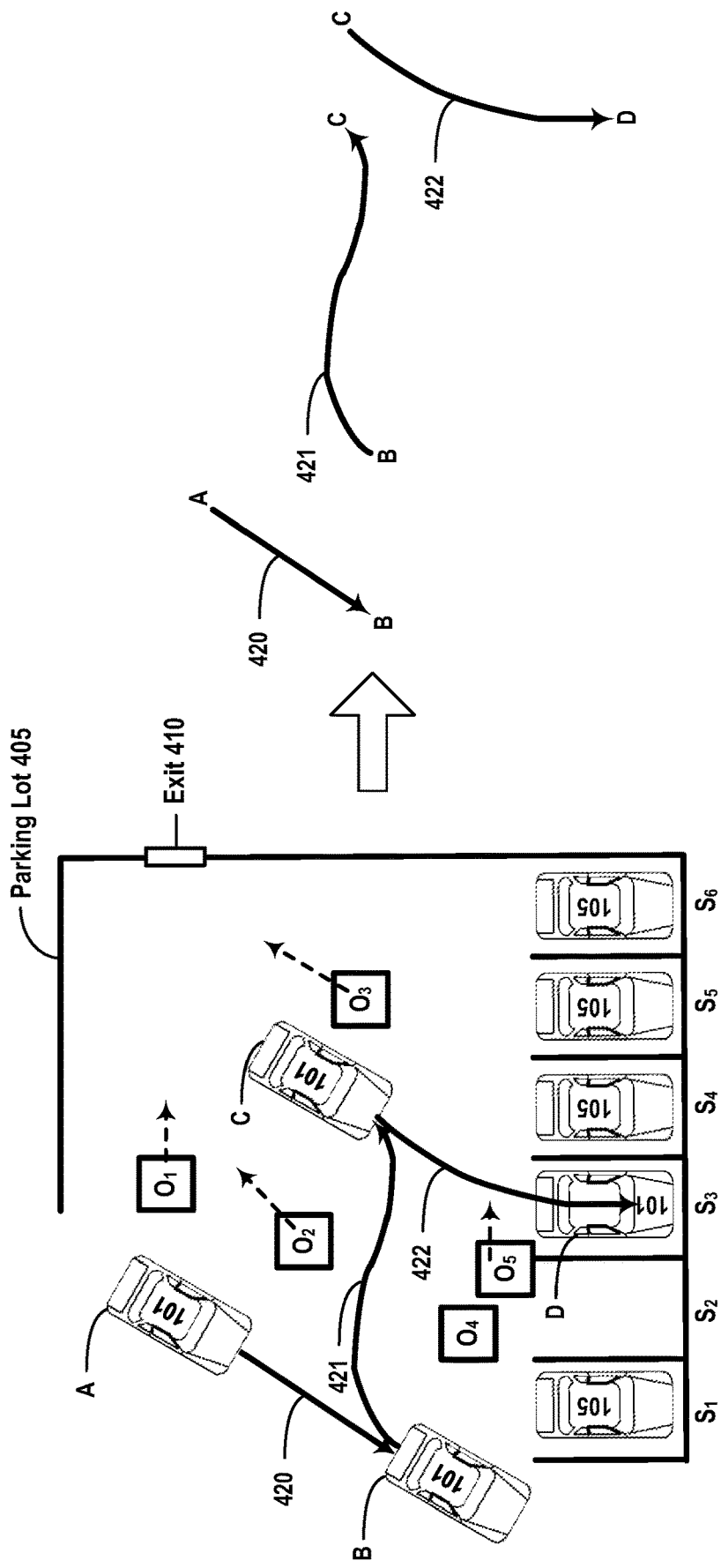
FIG. 4A illustrates an example ADV path of an autonomous vehicle performing optimized planning of parking trajectory and obstacle avoidance when parking an autonomous driving vehicle (ADV) according to one embodiment.
FIG. 4B illustrates the example ADV parking path of FIG. 4A, separated into parking path segments, according to some embodiments.

FIG. 4A illustrates an example path of an autonomous driving vehicle (ADV) performing optimized planning of parking trajectory and obstacle avoidance when parking the ADV, according to one embodiment. In FIG. 4A, an ADV 101 has approached and entered a parking lot 405 that includes parking spaces $S_1$ through $S_6$ ($S_1 \ldots S_6$). Parked cars 105 are shown in parking spaces $S_1$, $S_4$, $S_5$, and $S_6$. Parking spaces $S_2$ and $S_3$ are available. ADV 101's perception 302 and prediction 303 modules detect obstacles $O_1$ through $O_5$ ($O_1 \ldots O_5$). All obstacles except $O_4$ appear to be moving toward exit 410, as shown by the dashed arrow associated with each of $O_1$-$O_3$ and $O_5$. $O_4$ is perceived as stationary, such as a pedestrian that notices ADV 101 moving, and the pedestrian has stopped walking, waiting to see what ADV 101 will do next. Parking planner 308 has selected parking space S3 and has generated a parking path with points A, B, C, and D. The parking path accounts for obstacles $O_1 \ldots O_5$ from ADV 101's current position at point A, to ADV 101's parked position at point D.

The parking path as three parking path portions (or "segments") 420, 421, and 422. At this initial parking path phase of the parking process, the path A-B-C-D can be a simple zig-zag path for which each portion 420-422 has not yet been generated as a smooth reference line. The parking path is broken into the three portions 420-422 by breaking the path at indifferentiable points in the parking path. Indifferentiable points are discontinuous points along the parking path for which a derivative is not defined. In this example, point B, breaks 420 and 421 and point C breaks 421 and 422. As shown by the arrows on segments 420-422, in segment 420 the ADV 101 drives in a forward direction. In segment 421, the ADV 101 backs up in reverse from point B to point C. And, in segment 422 the ADV 101 again drives in a forward direction from point C to point D to park the ADV 101.

FIG. 4B illustrates the segments 420 through 422 of the parking path of ADV 101 along points A-D to park in space $S_3$. Segment 420 is a forward direction portion. The perception, prediction, and planning logic is set (or reset) to forward direction, and the drive unit 204 is set to control the ADV in a forward driving direction. Perception and prediction modules detect obstacles $O_1 \ldots O_5$ and predict their respective direction and speed (if any). Planning module 305 determines a smooth reference line for segment 420, in view of obstacles $O_1 \ldots O_5$ and their respective location, direction, and speed (if any). ADV 101 then navigates the reference line for segment 420 from point A to point B. At point B, segment 421 requires a reversal of the drive unit 204, and a corresponding inversion of the orientation of the perception 302, prediction 303, and planning 305 modules.

After inverting the orientation of the perception 302 and prediction 303 modules to reverse direction, perception 302 and prediction 303 modules update the locations, direction, and speed (if any) of each obstacle $O_1 \ldots O_5$, and any newly perceived obstacle(s). Planning module 305 then determines a smooth reference line from point B to point C for segment 421 of the parking path, taking into account obstacles $O_1 \ldots O_5$, and any newly detected obstacles. ADV 101 then navigates from point B to point C, in reverse driving direction, using the smooth reference line for segment 421, and taking into account obstacles $O_1 \ldots O_5$. At point C, segment 422 requires a forward drive direction. Gear unit 204 is set to forward driving direction, and the orientation of perception 302, prediction 303, and planning modules 305 is set (or reset) to forward direction. Perception 302 and prediction 303 modules detect obstacles $O_1 \ldots O_5$ and any newly detected obstacles and prediction module 303 updates the location, speed, and direction (if any) of the obstacles. Planning module 305 generates a smooth reference line from point C to point D taking into account any obstacles, their location, direction, and speed, and parked car 105 in space $S_4$. ADV 101 then navigates, in forward driving direction, the smooth reference line for portion 422 from point C to point D and parks in space $S_3$.

Figures 5A, 5B:
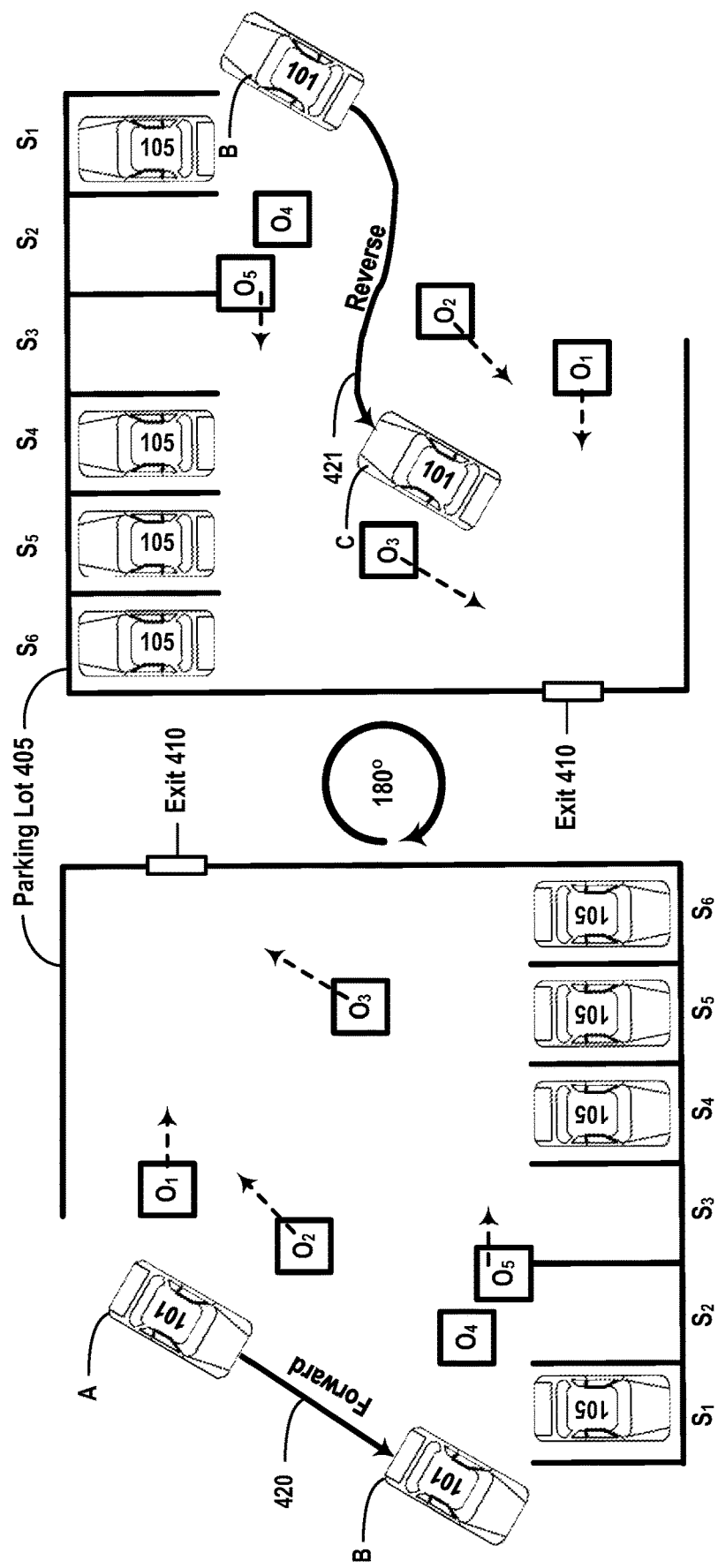
FIG. 5A illustrates the first segment of the example ADV parking path of FIG. 4A, according to an embodiment.
FIG. 5B illustrates the second segment of the example ADV parking path of FIG. 4A, according to an embodiment.
Figure 5C:
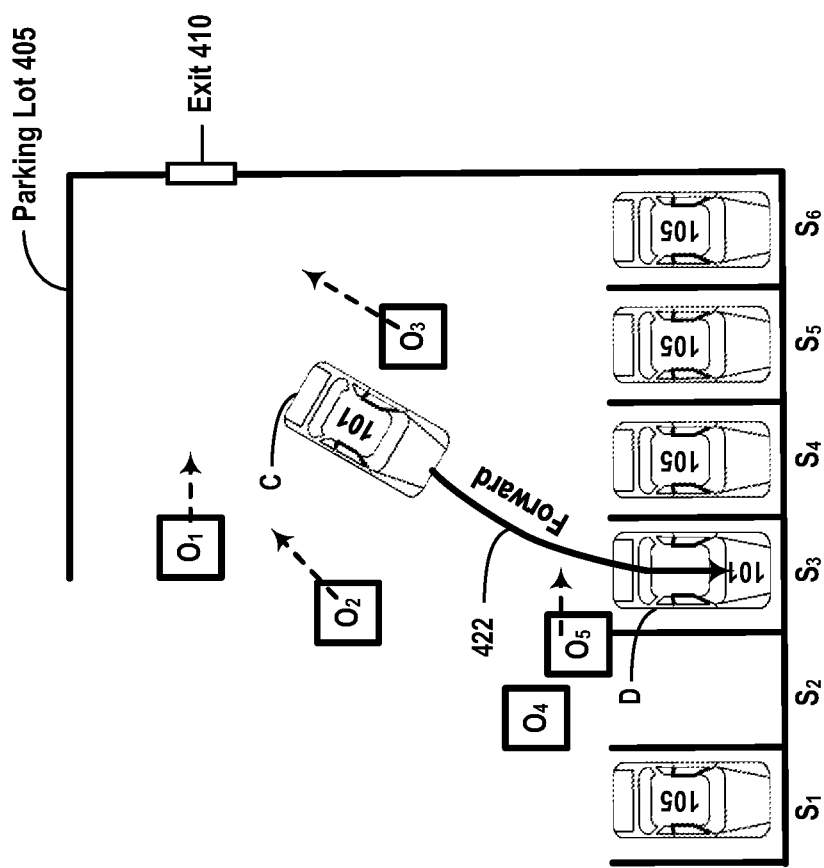
FIG. 5C illustrates the third segment of the example ADV parking path of FIG. 4A, according to an embodiment.

FIGS. 5A through 5C illustrate the logic and example of FIGS. 4A and 4B, above, with the perception and prediction information overlaid onto each segment of the parking path 420 . . . 422 in accordance with the driving direction and driving orientation of each segment of the parking path. Reference symbols in FIGS. 5A-5C that are the same as or similar to reference symbols in FIGS. 4A and 4B reference the same or similar elements as in FIGS. 4A and 4B.

In FIG. 5A, ADV 101 is driving in a forward driving direction from point A to point B along parking path segment 420. FIG. 5A illustrates the perception module 302 and prediction module 303 information in the forward direction orientation. The information includes the parking lot 405, exit 410, ADV 101, direction and location of obstacles $O_1 \ldots O_5$, parking spaces $S_1 \ldots S_6$, and parked cars 105 in accordance with the forward driving direction of ADV 101.

In FIG. 5B, ADV 101 switches to a reverse driving direction from point B to point C along parking path segment 421. Perception/planning inverter 309 inverts the orientation of perception module 302, prediction module 303, and planning module 305 to match the reverse driving direction of the ADV 101. In an embodiment, inverting the orientation of perception module 203, prediction module 303, and planning module 305 can be performed by logically rotating the modules by 180° as shown in FIG. 5B. After inverting the orientation, perception module 302 and prediction module 303 can update the location, direction, and speed of obstacles $O_1 \ldots O_5$, and any other newly detected obstacles. Planning module 305 can then plan the smooth reference line from point B to point C, driving in reverse driving mode, along segment 421, taking into account any obstacles and their location, direction, and speed. ADV 101 can navigate the smooth reference line, in reverse driving direction, to point C.

In FIG. 5C, ADV 101 is at location C and again changes driving direction from reverse driving direction to forward driving direction. Drive unit 204 can change the drive direction from reverse to forward direction. The logical orientation of perception module 302 and prediction module 303 can be inverted, or simply reset, to forward direction orientation. Perception module 302 can update the obstacles surrounding the ADV 101 and prediction module 303 can update the location, direction, and speed of the obstacles surrounding the ADV 101. Then, planning module 305 can generate a smooth reference line from point C to point D along parking path segment 422 and ADV 101 can navigate the smooth reference line, in forward driving direction, to parking space $S_3$.

Figure 6A:
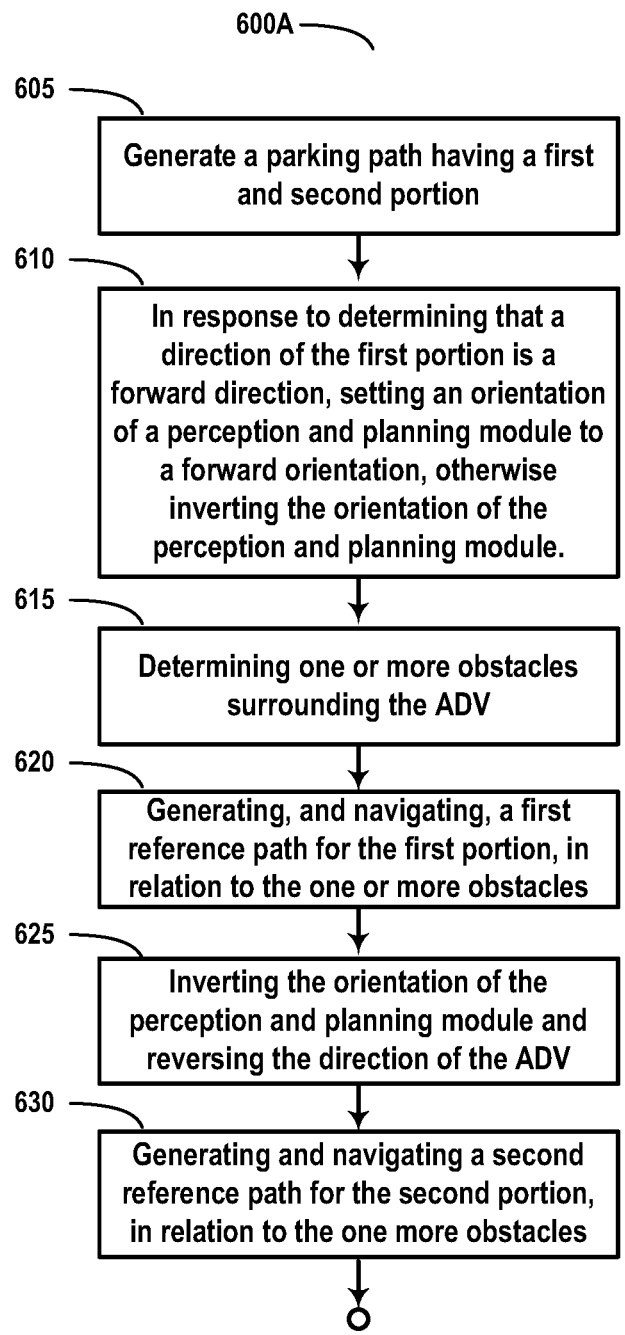
FIG. 6A is a block diagram illustrating a method of an autonomous vehicle performing optimized planning of parking trajectory and obstacle avoidance when parking an autonomous driving vehicle (ADV) according to one embodiment.

FIG. 6A is a block diagram illustrating a method 600A of an autonomous driving vehicle (ADV) performing optimized planning of a parking trajectory and obstacle avoidance when parking the ADV, according to one embodiment.

In operation 605, the ADV 101 parking planner 308 can generate a parking path from a current location of the ADV 101 to the selected parking space, and taking into account obstacles surrounding the ADV 101, and their respective location, direction, and speed. The parking path can be a zig-zag path, comprising portions that are not yet smoothed into a reference line for navigation by the ADV 101. The parking path can have at least a first portion and a second portion, each portion having a different direction of operation of the ADV.

In operation 610, in response to determining that a direction of the first portion of the parking path is a forward direction, the logic of the ADV sets the orientation of the perception and planning modules (and, optionally, the prediction module) to a forward orientation. Otherwise, the ADV logic inverts the orientation of the perception and planning (and, optionally, the prediction module) to a reverse orientation. In an embodiment, inverting the orientation of the planning, perception, and optionally prediction, modules can be accomplished by logically rotating the orientation of these modules by 180° or π radians.

In operation 615, perception module can determine one or more obstacles surrounding the ADV. In an embodiment, the prediction module determines also determines a direction and speed of trajectory of each of the one or more obstacles.

In operation 620, planning module generates first reference path from the first portion of the parking path, taking into account the one or more obstacles. The planning module can smoothly navigate the ADV along the reference path for the first portion of the parking path.

In operation 625, ADV logic can invert the orientation of the perception, planning, and optionally prediction, modules so that these modules are operable in a reverse operating direction of the ADV. ADV logic can also set the driving direction of the ADV into a reverse operating mode using the drive unit 204.

In operation 630, planning module generates second reference path from the second portion of the parking path, taking into account the one or more obstacles. The planning module can smoothly navigate the ADV along the reference path for the second portion of the parking path.

Figure 6B:
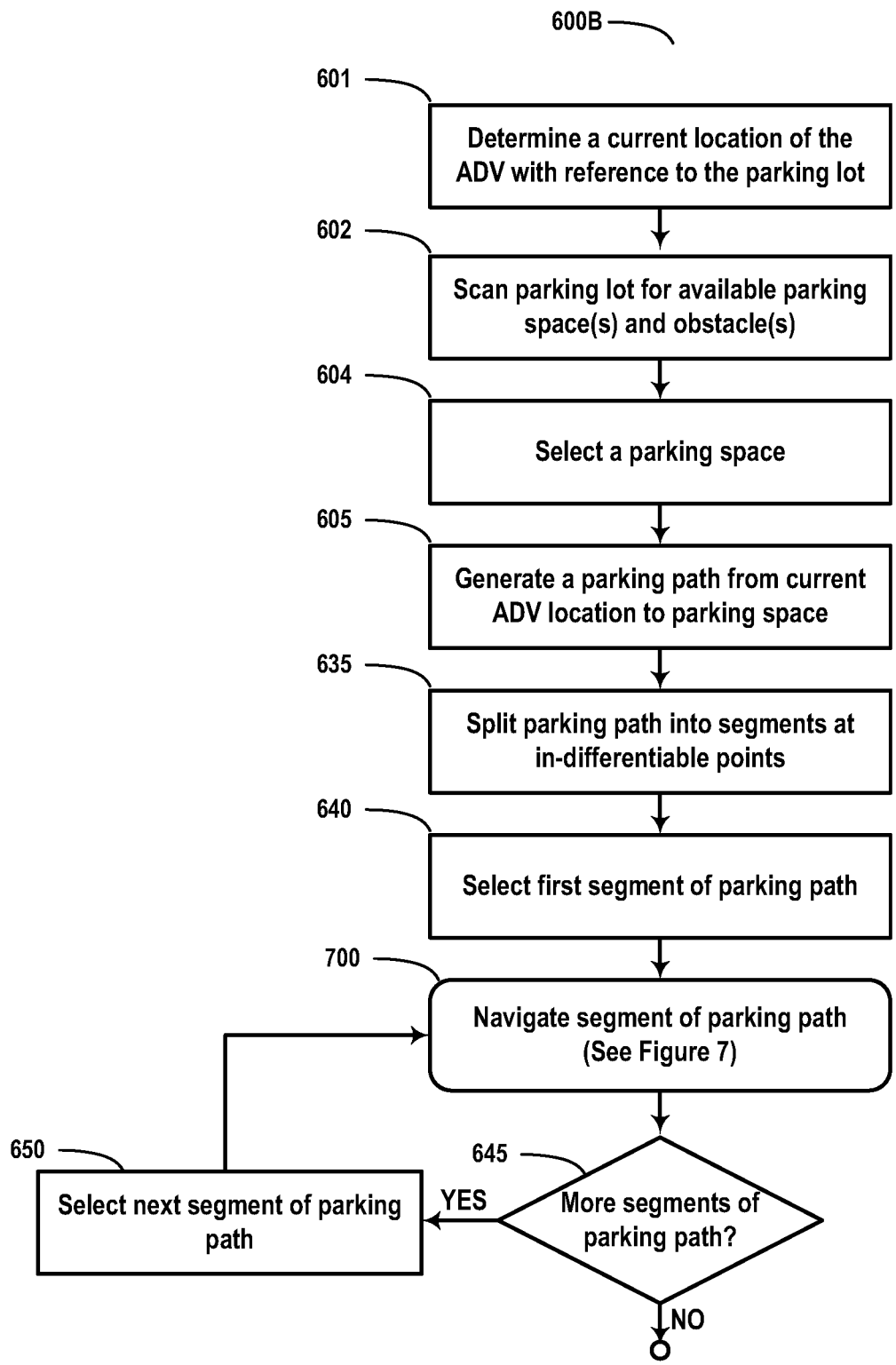
FIG. 6B is a block diagram illustrating a method of an autonomous vehicle performing optimized planning of parking trajectory and obstacle avoidance when parking an autonomous driving vehicle (ADV) according to one embodiment.

FIG. 6B is a block diagram illustrating a method 600B of an autonomous driving vehicle (ADV) performing optimized planning of parking trajectory and obstacle avoidance when parking the ADV, according to one embodiment.

In operation 601, ADV 101 can determine a location of the ADV with respect to one or more parking spaces, such as in a parking lot. ADV 101 can use a high definition map and ADV logic to determine a parking area and parking spaces near the ADV 101. Alternatively, or in addition, ADV 101 can use perception 302 and prediction 303 modules to determine parking spaces near the ADV 101.

In operation 602, ADV 101 can scan the parking area for available parking space(s) and obstacle(s) surrounding the ADV 101. ADV 101 can use perception module 302 and prediction module 203 to determine one or more obstacles surrounding the ADV, and their respective location, direction, and speed. ADV 101 can use a high definition map in combination with the perception 302 and prediction 303 modules to determine parking spaces which may be available near the ADV 101.

In operation 604, ADV 101 can select an available parking space. ADV 101 parking planner 308 can determine an available parking space that has a best parking path from the current ADV location to the parking space location, taking into account obstacles surrounding the ADV 101, and their respective location, direction, and speed.

In operation 605, the ADV 101 parking planner 308 can generate a parking path from a current location of the ADV 101 to the selected parking space, and taking into account obstacles surrounding the ADV 101, and their respective location, direction, and speed. The parking path can be a zig-zag path, comprising portions that are not yet smoothed into a reference line for navigation by the ADV 101.

In operation 635, ADV logic can split the parking path into a plurality of portions or segments. The parking path can be split at indifferentiable (discontinuous) points along the parking path.

In operation 640, ADV 101 logic can select a first portion or segment of the parking path for navigating the ADV 101 from its current location to the selected parking space.

In operation 700, the selected segment is navigated by the ADV 101. Operation 700 is described in more detail, below, with reference to FIG. 7.

In operation 645, it can be determined whether there are more segments of the parking path to navigate. If so, then method 600B continues at operation 650, otherwise method 600B ends.

In operation 650, ADV 101 parking logic can select the next segment in the parking path. Method 600B continues at operation 700.

Figure 7:
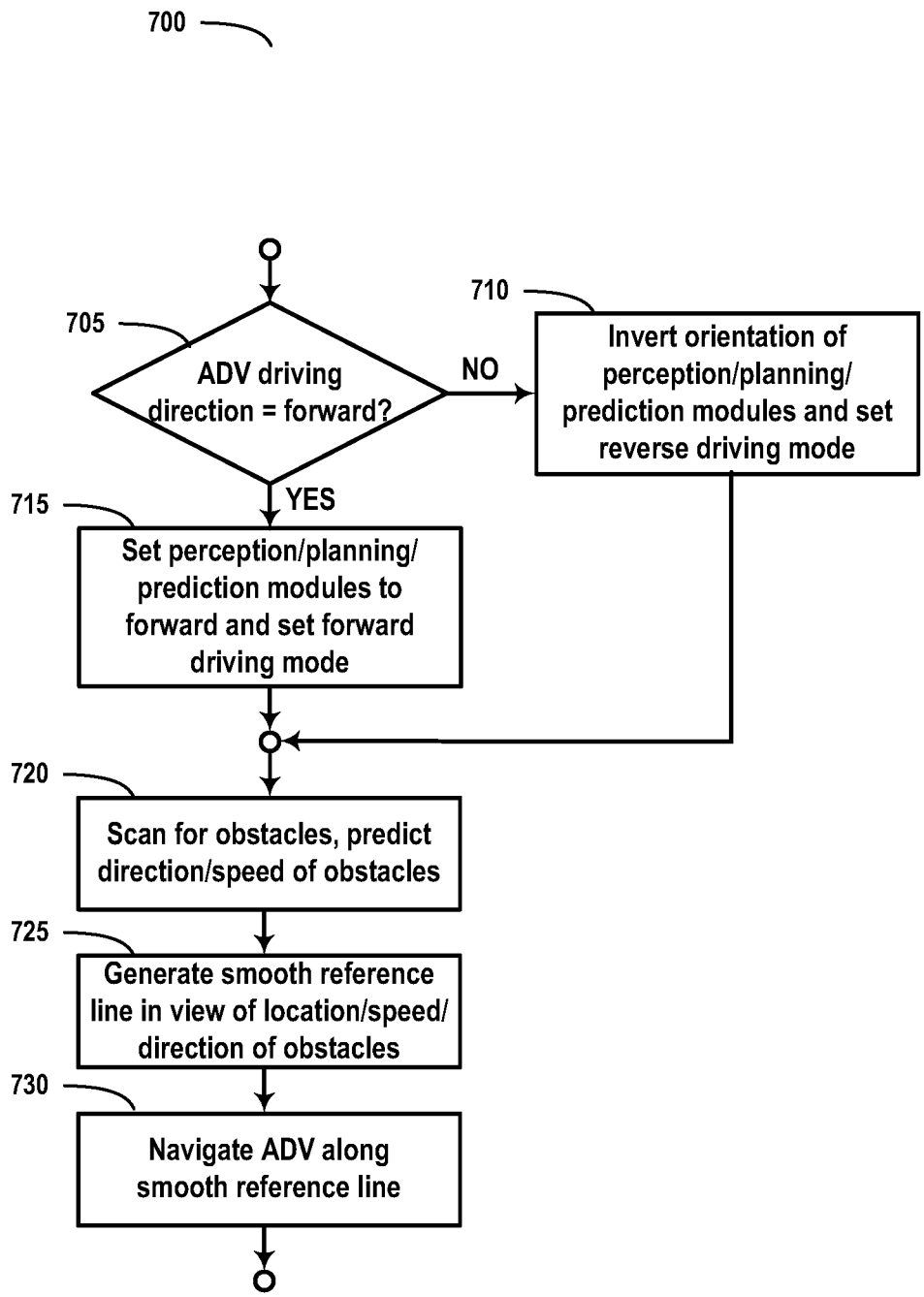
FIG. 7 is a block diagram illustrating a method of an autonomous vehicle performing optimized planning of parking trajectory and obstacle avoidance when parking an autonomous driving vehicle (ADV) according to one embodiment.

FIG. 7 is a block diagram illustrating a method 700 of an autonomous vehicle performing optimized planning of parking trajectory and obstacle avoidance when parking an autonomous driving vehicle (ADV) according to one embodiment. Method 700 can be called from method 600B, described above with reference to FIG. 6B. Method 700 navigates a single segment of a parking path that can have multiple segments to park the ADV 101 in a parking space.

In operation 705, ADV 101 logic can determine whether the ADV driving direction for the parking path segment is a forward direction. If so, then method 700 continues at operation 715, otherwise method 700 continues at operation 710.

In operation 710, ADV 101 logic can invert the orientation of the perception and planning modules to a reverse driving direction, and planning modules and drive unit 204 can be set to reverse driving direction. In an embodiment, the prediction module can also be set to invert its orientation to match the perception and planning modules. Method 700 continues at operation 720.

In operation 715, ADV 101 logic can set (or reset) the orientation of the perception, and planning modules to a forward driving direction, and use the drive unit 204 to forward driving direction. In an embodiment, the prediction module orientation is set (or reset) to the same orientation as the perception and planning modules In operation 720, perception module 302 can scan for obstacles surrounding the ADV 101. Prediction module 303 can predict a speed and direction of the obstacles.

In operation 725, planning module 303, including parking planning module 308, can generate a smooth reference line for the single segment of the parking path for which method 700 was called. The smooth reference line can take into account obstacles surrounding the ADV 101, and the respective location, speed, and direction, of the obstacles.

In operation 730, the ADV 101 can navigate the smooth reference line generated for the parking path segment in operation 325. Then method 700 ends and returns to the method that called method 700.

Figure 8:
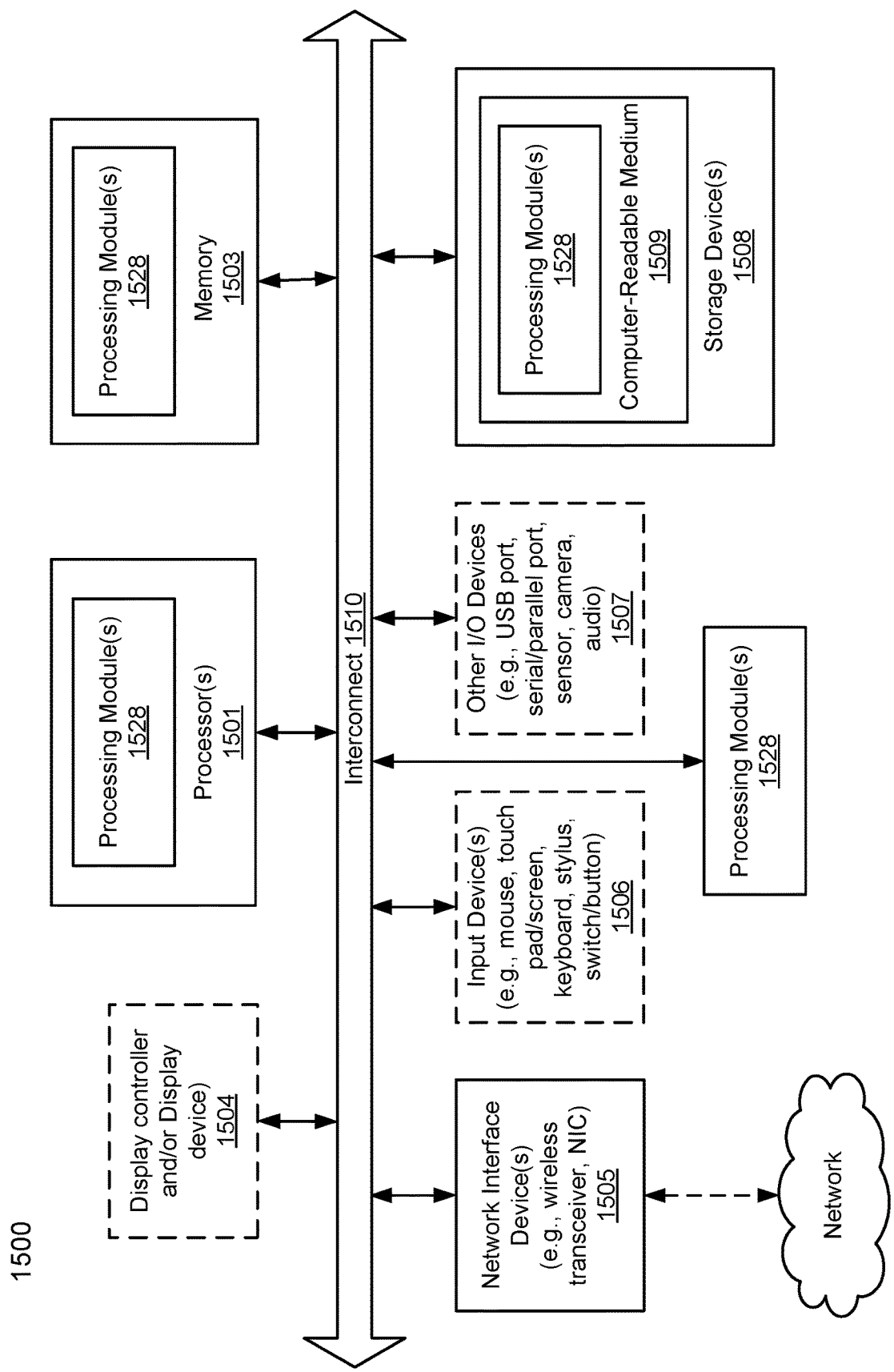
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS−/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or parking planning module 308, and perception/planning inverter 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of parking an autonomous driving vehicle (ADV), the method comprising:
    generating, by a perception and planning module of the ADV, a parking path comprising a first path portion and a second path portion;

in response to determining that a direction for the first path portion is a forward direction of the ADV, setting an orientation of the perception and planning module of the ADV to a forward orientation of the ADV, otherwise inverting the orientation of the perception and planning module of the ADV by logically rotating an orientation of the perception and planning module 180 degrees;

determining, by the perception and planning module, one or more obstacles surrounding the ADV;

generating, by the perception and planning module, and autonomously navigating the ADV along, a first reference path for the first path portion, in relation to the one or more obstacles;

inverting the orientation of the perception and planning module, by logically rotating the orientation of the perception and planning module 180 degrees, wherein a physical driving direction of the ADV is distinct from the orientation of the perception and planning module such that the perception and planning module is oriented as driving forward when the ADV is driven in reverse;

in response to inverting the orientation of the perception and planning module, updating a location, speed, and direction of each of the obstacles surrounding the ADV, and automatically reversing a driving direction of the ADV;

generating, by the perception and planning module, and navigating the ADV along, a second reference path for the second path portion, in relation to the one or more obstacles;

wherein the perception and planning module continues updating the location, speed, and direction of the one or more obstacles throughout the parking of the ADV, including while driving in the reverse direction.

2. The method of claim 1, further comprising, predicting, for both the first reference path and the second reference path, a direction of each of the one or more obstacles surrounding the ADV.

3. The method of claim 2, further comprising predicting, for both the first reference path and the second reference path, a speed of each of the one or more obstacles surrounding the ADV.

4. The method of claim 2, wherein generating and navigating the first reference path and the second reference path takes into account the predicted direction of each of the one or more obstacles.

5. The method of claim 1, wherein generating the parking path further comprises:
determining a location of the ADV and a location of an available parking space; and
selecting a parking space and determining a location of the selected parking space.

6. The method of claim 5, wherein generating the parking path further comprises:
generating a zig-zag path from the location of the ADV to the location of the selected parking space, taking into account the one or more obstacles.

7. The method of claim 1, wherein the ADV is in a forward driving direction when the ADV is configured to operate using a forward gear and the ADV is in a reverse driving direction when the ADV is configured to operate using a reverse driving gear.

8. A non-transitory computer-readable medium programmed with executable instructions that, when executed by a processing system, perform operations for parking an autonomous driving vehicle (ADV), the operations comprising:

generating, by a perception and planning module of the ADV, a parking path comprising a first path portion and a second path portion;

in response to determining that a direction for the first path portion is a forward direction of the ADV, setting an orientation of the perception and planning module of the ADV to a forward orientation of the ADV, otherwise inverting the orientation of the perception and planning module of the ADV by logically rotating an orientation of the perception and planning module 180 degrees;

determining, by the perception and planning module, one or more obstacles surrounding the ADV;

generating, by the perception and planning module, and autonomously navigating the ADV along, a first reference path for the first path portion, in relation to the one or more obstacles;

inverting the orientation of the perception and planning module, by logically rotating the orientation of the perception and planning module 180 degrees, wherein a physical driving direction of the ADV is distinct from the orientation of the perception and planning module such that the perception and planning module is oriented as driving forward when the ADV is driven in reverse;

in response to inverting the orientation of the perception and planning module, updating a location, speed, and direction of each of the obstacles surrounding the ADV, and automatically reversing a driving direction of the ADV;

generating, by the perception and planning module, and autonomously navigating the ADV along, a second reference path for the second path portion, in relation to the one or more obstacles;

wherein the perception and planning module continues updating the location, speed, and direction of the one or more obstacles throughout the parking of the ADV, including while driving in the reverse direction.

9. The medium of claim 8, further comprising, predicting, for both the first reference path and the second reference path, a direction of each of the one or more obstacles surrounding the ADV.

10. The medium of claim 9, further comprising predicting, for both the first reference path and the second reference path, a speed of each of the one or more obstacles surrounding the ADV.

11. The medium of claim 9, wherein generating and navigating the first reference path and the second reference path takes into account the predicted direction of each of the one or more obstacles.

12. The medium of claim 8, wherein generating the parking path further comprises:
determining a location of the ADV and a location of an available parking space; and
selecting a parking space and determining a location of the selected parking space.

13. The medium of claim 12, wherein generating the parking path further comprises:
generating a zig-zag path from the location of the ADV to the location of the selected parking space, taking into account the one or more obstacles.

14. The medium of claim 8, wherein the ADV is in a forward driving direction when the ADV is configured to operate using a forward gear and the ADV is in a reverse driving direction when the ADV is configured to operate using a reverse driving gear.

15. A system comprising a processing system having at least one hardware processor, the processing system coupled to a memory programmed with executable instructions that, when executed by the processing system perform operations for parking an autonomous driving vehicle (ADV), the operations comprising:

generating, by a perception and planning module of the ADV, a parking path comprising a first path portion and a second path portion;

in response to determining that a direction for the first path portion is a forward direction of the ADV, setting an orientation of the perception and planning module of the ADV to a forward orientation of the ADV, otherwise inverting the orientation of the perception and planning module of the ADV by logically rotating an orientation of the perception and planning module 180 degrees;

determining, by the perception and planning module, one or more obstacles surrounding the ADV;

generating, by the perception and planning module, and autonomously navigating the ADV along, a first reference path for the first path portion, in relation to the one or more obstacles;

inverting the orientation of the perception and planning module by logically rotating the orientation of the perception and planning module 180 degrees, wherein a physical driving direction of the ADV is distinct from the perception and planning orientation such that the perception and planning module is oriented as driving forward when the ADV is driven in reverse;

in response to inverting the orientation of the perception and planning module, updating a location, speed, and direction of each of the obstacles surrounding the ADV, and automatically reversing a driving direction of the ADV;

generating, by the perception and planning module, and autonomously navigating the ADV along, a second reference path for the second path portion, in relation to the one or more obstacles;

wherein the perception and planning module continues updating the location, speed, and direction of the one or more obstacles throughout the parking of the ADV, including while driving in the reverse direction.

16. The system of claim 15, further comprising, predicting, for both the first reference path and the second reference path, a direction of each of the one or more obstacles surrounding the ADV.

17. The system of claim 16, further comprising predicting, for both the first reference path and the second reference path, a speed of each of the one or more obstacles surrounding the ADV.

18. The system of claim 16, wherein generating and navigating the first reference path and the second reference path takes into account the predicted direction of each of the one or more obstacles.

19. The system of claim 15, wherein generating the parking path further comprises:
   determining a location of the ADV and a location of an available parking space; and
   selecting a parking space and determining a location of the selected parking space.

20. The system of claim 19, wherein generating the parking path further comprises:
   generating a zig-zag path from the location of the ADV to the location of the selected parking space, taking into account the one or more obstacles.

21. The system of claim 15, wherein the ADV is in a forward driving direction when the ADV is configured to operate using a forward gear and the ADV is in a reverse driving direction when the ADV is configured to operate using a reverse driving gear.

22. The method of claim 1, wherein at least one of the one or more obstacles is a moving obstacle, and the perception module continues tracking the movement of the at least one obstacle while driving in the reverse direction.

23. The method of claim 1, wherein when the ADV is driven in a reverse direction the planning module accounts for kinematic differences of the ADV between driving in a forward direction and driving in the reverse direction.

* * * * *